Oct. 2, 1951 G. E. HOLMES Re. 23,414

FUSE PLUG

Original Filed July 20, 1945

INVENTOR.
George E. Holmes
BY
Thomas D. Lane
HIS ATTORNEY.

Reissued Oct. 2, 1951

Re. 23,414

UNITED STATES PATENT OFFICE 23,414

FUSE PLUG

George E. Holmes, Detroit, Mich.

Original No. 2,498,124, dated February 21, 1950, Serial No. 606,113, July 20, 1945. Application for reissue January 20, 1951, Serial No. 206,941

12 Claims. (Cl. 200—125)

Matter enclosed in heavy brackets [ ] appears in the original patent but forms no part of this reissue specification; matter printed in italics indicates the additions made by reissue.

The present invention relates to fuse plugs of the type which contain a plurality of fuse elements and which permit a new element to be brought into service when the element formerly in service is blown.

A fuse plug of this type is shown in my Patent No. 2,383,484 of August 28, 1945. The construction shown in this patent is extremely simple and economical to manufacture. In order to bring a new fuse element into service, however, it is necessary to unscrew the fuse and remove it from the socket and then to withdraw the fuse carrier partially from the assembly before it can be turned to establish connection with a new fuse element. The present invention overcomes this inconvenience while retaining the simplicity of construction of the fuse plug shown in the earlier patent.

An object of the invention is to provide a fuse plug of this character in which a new fuse element is brought into service by rotation of the threaded shell. A threaded shell is a necessary part of any fuse plug and by making it rotatable and providing it with a contact member to engage the various fuse links, the same part is made to serve a double purpose thereby increasing the economy of manufacture.

Other and further objects will become apparent upon reading the following specification together with the accompanying drawing forming a part hereof.

Referring to the drawing.

Figure 1:
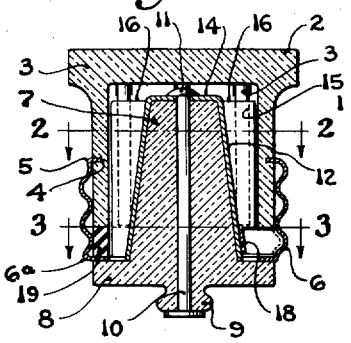
Fig. 1 is a sectional view in elevation.
Figure 6:
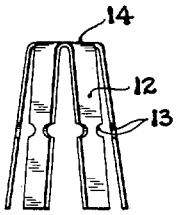
Fig. 6 is a side view of the fuse element unit.
Figure 4:
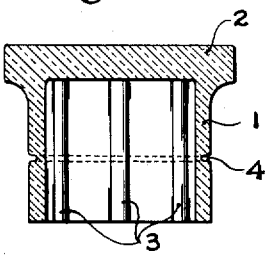
Fig. 4 is a vertical section of the head portion.
Figure 5:
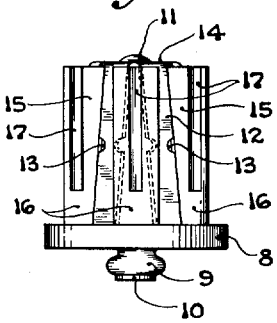
Fig. 5 is a side view of the fuse carrier.

Referring to Fig. 1, a hollow head 2 which serves to grip the device when inserting it in a fuse socket or unscrewing it therefrom is shown provided with a plurality of longitudinal internal ribs 3 which engage corresponding grooves 17 in fuse carrier 7. The head 2 and fuse carrier 7 thus rotate together as a unit. Head 2 and fuse carrier 7 are both constructed of suitable dielectric material and head 2 may be of glass permitting observation as to which of the fuse elements have been blown. Head 2 and fuse carrier 7 may be held together by suitable adhesive material engaging ribs 3 or in any other desired manner.

An integrally formed fuse member comprising a piece of fuse metal 14 is shown with downwardly and radially extending legs 12, each leg constituting an individual fuse element and being necked at 13 in the usual manner to localize the point of arcing when the fuse element is blown. The width of the necked portion also serves to determine the rating of the fuse. The fuse elements fit into corresponding upwardly sloping grooves 15 in fuse carrier 7 which provide an individual arcing chamber for each fuse element.

Common contact to the several fuse elements is established through a pin 10 which engages fuse member 14, the pin 10 being headed at 11. The lower head at the central bottom projection 10 of fuse carrier 7 is disposed to engage a contact in a fuse socket in the usual manner.

Threaded contact shell 6 is freely rotatably mounted on the assembly consisting of fuse carrier 7 and head 2. The upper inwardly turned lip 5 of shell 6 engages annular groove 4 in head 2. The lower portion is provided with an inwardly extending flange 6a which engages the upper surface of base portion 8 of fuse carrier 7 applying suitable contact pressure at the lower head of pin 10 when the entire assembly is screwed into a fuse socket. The gap between the lower portion of head 2 and the lower flange 6a of shell 6 is filled by a partial ring of suitable insulating material adapted to prevent the arc accompanying the blowing of the fuse element in service from damaging a fuse element in an adjacent groove.

An inwardly extending spring contact member 18 is permanently connected to the lower internal portion of shell 6 both electrically and mechanically and engages the lower portion of the particular fuse element 12 which is in service. The other elements are insulated by the lower wall of head 2 and by barrier ring 19. Spring 18 is shaped to act in a manner similar to that of a ratchet. Shell 6 may be rotated in one direction to bring successive fuse elements into service. When moved in this direction it will move outwardly over one of the ribs 16 and spring back to engage the fuse element in the next groove. This action serves as a detent mechanism so that engagement with the next fuse element may be determined both by feel and by the audible click as contact spring 18 snaps back to its normal position after passing the rib 16. Rotation in the opposite direction relative to head 2 and fuse carrier 7 is prevented by the contact spring 18 which will engage the side of one of the grooves 15.

Figure 8:
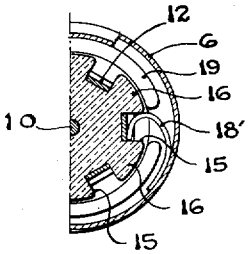
Fig. 8 is a fragmentary plan view of a modification of the invention and except for the modification is otherwise the same as Fig. 3.
Figure 3:
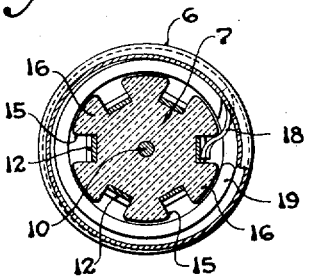
Fig. 3 is a sectional plan view taken along the line 3—3 of Fig. 1.

Contact spring 18 may take the form shown in Fig. 3 or it may take the modified form shown at 18′ in Fig. 8. It may also take any other desired form embodying the same principle of operation. The switching action to bring a new fuse element into service may take place either on rotation to screw the fuse plug into the socket or on rotation in a direction to unscrew the plug. The shell 6 may be provided with either a right hand or a left hand thread. The embodiment illustrated shows a right hand thread with a new fuse element being brought into service upon turning the head in a direction to screw the plug into a fuse socket. The modification required to obtain any other desired combination will be obvious to those skilled in the art.

Ordinarily, it will be desirable to have a new fuse element brought into service upon turning head 2 to screw the fuse plug into the socket. This insures that the fuse plug may always be unscrewed even if it is held by considerable friction. The assembly comprising the glass head portion 3 and the fuse carrying inner core portion in the form illustrated are secured together for common rotation by the interfitting tongue and groove arrangement best shown in Fig. 2. The threaded contact shell 6 however is freely rotatable relatively to this assembly, except for the spring pressed frictional engagement provided by the spring pressed contact pawl 18 in one rotative direction, and in the opposite rotative direction, by the ratchet locking action of the pawl.

For example, Fig. 3 shows the pawl 18 arranged for a contact shell 6 having right hand screw threads, which is standard practice at present at least in the United States. In this case the turning moments for screwing the device into and out of a fuse socket will be applied to the head-core assembly by grasping and turning the annular top flange of the head 2. The spring frictional grip of the pawl 18 with the fuse carrying core, is sufficient to cause the shell to rotate with the head-core assembly for screwing the entire fuse plug into a usual fuse socket until the bottom of the central contact 10 engages the usual central contact member in the fuse socket, not shown. The screwing of the fuse plug into its socket is permitted in a usual manner since the threaded shell 6, like all threaded fuses of this general class, are made to fit freely in their fuse sockets.

Once the central fuse plug contact member 10 bottoms in the fuse socket, it causes a slight frictional jamming action between the threads of the contact shell 6 and the usual threaded wall of the socket sufficient to arrest further rotation of the shell. After this occurs, further rotation of the head-core assembly in a direction to screw the fuse plug into its socket will cause the head-core assembly to rotate relatively to the thus stationarily held threaded contact shell 6. This relative rotation causes the spring pressed contact pawl 18 to cam over the raised intervening barriers 16 between the grooves for adjacent fuse strips 12. As the spring pressed pawl passes each successive barrier it snaps inwardly into the next succeeding fuse groove in the core 7, contacting the fuse strip therein. These snappings of the spring pressed contact pawl are audible and also can be clearly felt by the one turning the fuse. When a fresh fuse plug is first inserted in a socket with all of its fuse elements intact, it is immaterial on which fuse strip or leg 12 the contact pawl rests. The narrow necked blowout portions 13 of the fuses are visible through the glass of the sides of the head portion 2, and it is thus possible visibly to check the condition of the fuse elements.

When a fuse strip or leg 12 "blows," as its destruction by an excess current load is termed, the line which the fuse protects should be cleared of the condition which caused the fuse to blow. The head-core assembly then may be rotated in the direction tending to screw the contact shell 6 into its socket, until the first click of the pawl spring is heard and felt by the one doing the turning. When this occurs the next successive fuse strip or leg is contacted by the pawl and the fuse is ready for re-use. When all of the fuse strips or legs 12 have been blown, the entire fuse plug may be removed from its socket by a counterrotation or unscrewing of the core-plug assembly.

As clearly shown in Figs. 3 and 8 this counterrotational or unscrewing torque moment causes the pawl 18 or 18′ to lock against the radially disposed wall of the groove in which the pawl is resting. This locking action of the pawl is sufficient to overcome the frictional or slight jamming action which held the threaded shell 6 against rotation during the rotation of the head-core assembly for changing fuse strips 12 as above set forth.

Figure 2:
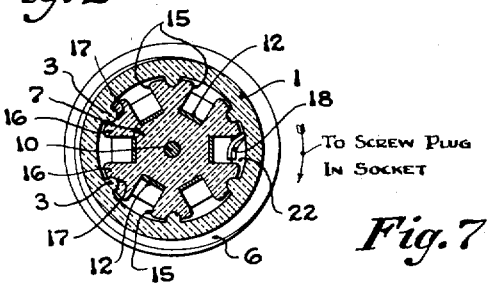
Fig. 2 is a sectional plan view along the line 2—2 of Fig. 1.
Figure 7:
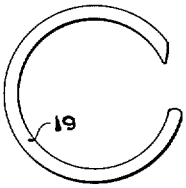
Fig. 7 is a plan view of an arc barrier ring.

All unblown fuse strips or legs may be seen through the sides of the glass head 2. The blowing of one fuse strip or leg 12 will blacken up its own "window" section which the glass overlying its enclosing channel aptly may be termed. The blowing action of one fuse strip however is not permitted to spread laterally to other channels or fuse strips, since each channel for a fuse strip is sealed laterally from adjacent channels by the interfitting of the abutments 15 on the plug against the ribbed inner face of the head as best shown in Fig. 2.

The channels for the fuses open into the space between the top of the fuse plug 7 and the head 2 to permit expansion of the small amount of gas created by the blowing of the fuse. It is obvious from the above description and the accompanying drawings that the interior is not hermetically sealed so that no dangerous pressures can build up in the interior of the glass head 2.

While the fuse carrying plug 7 may be adhesively secured in inserted position in the glass head 2, it will work satisfactorily if merely inserted therein, so as to have frictional engagement therewith. In such arrangement, even though the plug should be inserted loosely in the head, when the entire fuse plug is screwed into a socket, the contact member 10, engaging the bottom of the socket as described previously herein, will force the plug up into properly seated position in the head and squeeze the parts into sealing relation with the insulating washer 19. With the head and fuse carrying plug thus assembled, the fuse carrying plug 7 can be replaced by a new one using the same head for still further economy of operation if desired.

I have shown what I believe to be the best embodiment of my invention. I do not wish, however, to be limited to the embodiment shown but what I desire to secure by Letters Patent is set forth in the appended claims.

I claim:

1. In a device of the class described, a fuse carrier having a plurality of [upwardly and inwardly extending] grooves therein, a head member secured *against relative rotation* to the carrier [by engagement with flanges intermediate the grooves] and partially enclosing the carrier, a fuse member having *a* plurality of [outwardly and downwardly extending] legs each leg forming a fuse element disposed within one of the grooves, a central connection from the fuse member to the lowermost portion of the carrier, a threaded contact shell freely rotatably secured to the head member, [and having an inwardly extending flange portion adapted] *said fuse carrier, head member and contact shell being assembled and secured* to exert downward pressure on the carrier when the device is tightened into a fuse socket, and a spring contact member carried by the shell and disposed to *transmit turning force applied to said head to said shell and to* establish successively an electrical connection to each of the fuse elements upon rotation of the shell with respect to the *head and* carrier.

2. A device as in claim 1 in which a circular member of insulating material is disposed within the shell rotatably therewith intermediate the [lowermost portion of the] head member and the [upper surface of the flange portion of the] shell and is provided with an opening permitting the spring contact member to pass therethrough to establish contact with the fuse elements.

3. A device as in claim 1 in which the contact member carried by the shell successively establishes connection to the fuse elements upon rotation in one direction and prevents rotation of the shell with respect to the carrier in the opposite direction.

4. A device as in claim 1 in which the contact member carried by the shell is secured directly thereto.

5. A device as in claim 1 in which the contact member carried by the shell is secured directly thereto and is further arranged to establish connection successively to the fuse elements upon rotation in one direction and to prevent rotation of the shell with respect to the carrier in the opposite direction.

6. In a device of the class described, a fuse carrier having a plurality of grooves therein arranged around a central rotative axis, a head member having interfitting relation with, *and partially enclosing* the fuse carrier, and secured to rotate with said fuse carrier, the portions intermediate the grooves comprising barriers, fuse strips in said grooves, a central electrically conductive connection from the fuse strips to the lowermost portion of the fuse carrier, a threaded contact shell freely rotatably secured to said head and fuse carrier, *said fuse carrier, head member and contact shell being assembled and secured* [a portion of said shell being adapted] to exert downward pressure on the *carrier* [central connection] when the device is screwed into a fuse socket, and a spring pressed contact member carried by the shell and disposed to *transmit turning force applied to said head to said shell and to* establish successively an electrical connection to each of the fuse elements on rotation of the head and carrier relatively to the shell.

7. A device as in claim 6 wherein the barriers intermediate the grooves are in sealing contact with the head member.

8. A device as in claim 6 wherein the barriers intermediate the grooves have interfitting relation with correspondingly shaped portions of the head member.

9. A device as in claim 6 wherein the spring contact member comprises an arcuately shaped strip of electrically conductive spring metal shaped to fit conformingly within the contact shell to rotate therewith, and having an inwardly offset pawl end portion disposed to contact successive fuse strips upon rotation of the shell relatively to the fuse carrier in one direction and to prevent rotation of the shell relatively to the fuse carrier in the opposite direction.

10. A device as in claim 6 wherein the spring contact member comprises a pawl having frictional engagement with the secured head and fuse carrier upon rotation of the contact shell in one direction relatively thereto, and having interlocking engagement with said secured head and fuse carrier to prevent relative rotation of the contact shell in the opposite direction.

*11. In a device of the class described, a hollow head open at one end and closed at the other, a fuse carrier non-rotatably mounted within said head, a plurality of fuse elements secured to the carrier, a cylindrical threaded contact shell laterally surrounding and rotatable relative to the head at its open end, a contact member carried by the shell and frictionally engaging the carrier to transmit to the shell a turning force applied to the head whereby the device may be screwed into a socket and adapted to successively engage and establish an electrical connection with each of the fuse elements upon rotation of the carrier and head with respect to the shell, and a contact member common to all of the fuse elements and extending beyond the carrier and the open end of the head to establish contact with a contact element of a fuse socket when the device is tightened therein.*

*12. A device as in claim 11 in which the contact member carried by the shell successively establishes electrical connection to the fuse elements upon rotation of the carrier and head in one direction and prevents rotation of the shell with respect to the carrier and head upon rotation in the opposite direction.*

GEORGE E. HOLMES.

REFERENCES CITED

The following references are of record in the file of this patent or the original patent:

UNITED STATES PATENTS

| Number | Name | Date |
|---|---|---|
| 1,437,905 | Moss et al. | Dec. 5, 1922 |
| 1,437,906 | Moss et al. | Dec. 5, 1922 |
| 1,848,924 | Ammerman | Mar. 8, 1932 |
| 1,914,871 | Siampos | June 20, 1933 |
| 2,058,264 | Schiller | Oct. 20, 1936 |
| 2,206,785 | Linton | July 2, 1940 |
| 2,383,484 | Holmes | Aug. 28, 1945 |